United States Patent [19]

Cawthon

[11] Patent Number: 5,609,941

[45] Date of Patent: Mar. 11, 1997

[54] AUTOMOTIVE DOOR PANEL CONSTRUCTION

[76] Inventor: Albert V. Cawthon, c/o PHC Industries, Inc., Camden, N.J. 08103

[21] Appl. No.: 503,061

[22] Filed: Jul. 11, 1995

[51] Int. Cl.⁶ .................... B32B 3/00; B60J 5/00
[52] U.S. Cl. .................... 428/172; 428/120; 428/167; 428/174; 428/192; 296/146.7
[58] Field of Search .................... 428/156, 45, 172, 428/81, 131, 141, 119, 120, 167, 192, 174, 137, 542.2; 296/146.7

[56] References Cited

U.S. PATENT DOCUMENTS 3,361,610  1/1968  Hannes ........................ 428/174
4,245,630  1/1981  Lloyd et al. .................. 428/172
4,781,956  11/1988  Zimmerman et al. ........ 428/43

*Primary Examiner*—Donald Loney
*Attorney, Agent, or Firm*—Zachary T. Wobensmith, III

[57] ABSTRACT

An improved automotive door panel construction which includes a backing layer of vacuum formed plastic, with a padding layer of polyester fiber thereon, a layer of dry heat activated adhesive, and a covering layer with the layers joined around the perimeter of the panel in a formed trough between die members, to which radio frequency energy is applied to cause the adhesive and plastic to melt, and the layers to join together in a three dimensional dielectric seal. The outer covering is stretched during joining to remove wrinkles and provide an improved finished product.

6 Claims, 2 Drawing Sheets

AUTOMOTIVE DOOR PANEL CONSTRUCTION

BACKGROUND OF THE INVENTION

1. Field of the Invention

This invention relates to automotive door panel construction of the type where a backing layer and multiple other layers are adhesively joined together in a three dimensional seal by heat and pressure in a die.

2. Description of the Prior Art

Automotive door panels are often constructed of a combination of panels which are separately assembled and then brought together to form a complete door panel. It is desirable to provide an upper panel that has a raised surface, that is cushioned and rounded, which is usually above and behind the armrest portion of the panel. The prior art panels are formed of ABS plastic in the flat and are layered to create the desired shape. The cushioning material used to provide the shape is a resin impregnated PVC foam material which upon subjection to radio frequency energy to bond the layers, reverts to its pre foam thickness, which often results in a less than satisfactory product.

The door panel of the invention has a base or backing layer which is preformed into the desired raised shape with cushioning and other layers bonded together to form a product that does not suffer from the disadvantages of the prior art panels and provides distinct advantages.

SUMMARY OF THE INVENTION

This invention relates to automotive door panel construction which includes a base layer of vacuum formed plastic, with a layer of polyester fiber padding thereon, a layer of heat activated adhesive, and an outer covering layer, which layers are dielectrically bonded under heat and pressure in a die.

The principal object of the invention is to provide door panel construction that is dielectrically sealed in a die, which easily recovers from deformation and retains its shape.

A further object of the invention is to provide door panel construction which contains recyclable components.

A further object of the invention is to provide door panel construction that is lightweight and easy to assemble.

A further object of the invention is to provide door panel construction that is durable and of low cost.

A further object of the invention is to provide door panel construction that is assembled while in a dry condition, and is useful with a variety of outer coverings.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Figure 1:
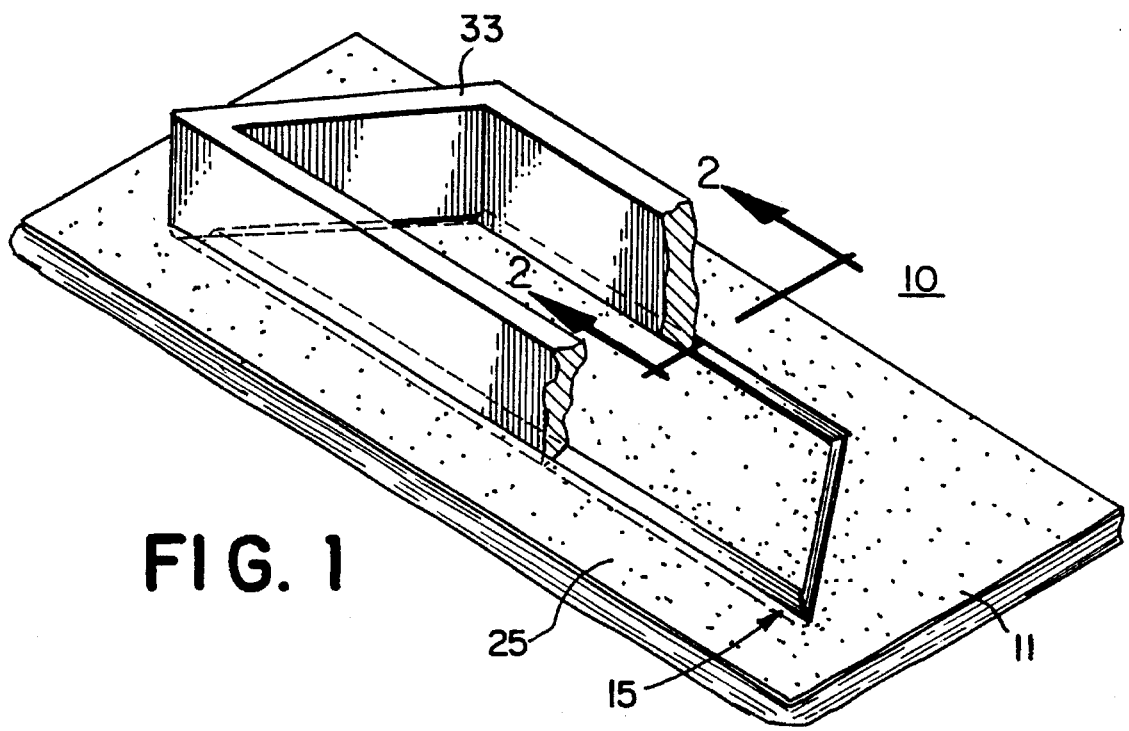
FIG. 1 is a view in perspective of the automotive door panel construction, partially broken away illustrating assembly of the door panel.
Figure 2:
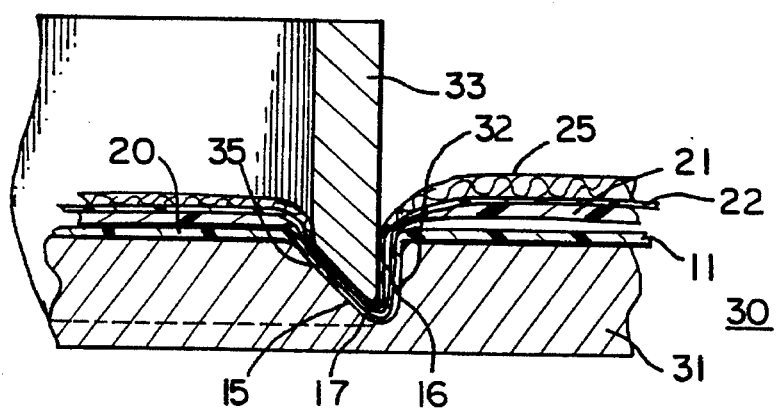
FIG. 2 is a vertical sectional view taken approximately on the line 2—2 of FIG. 1.
Figure 3:
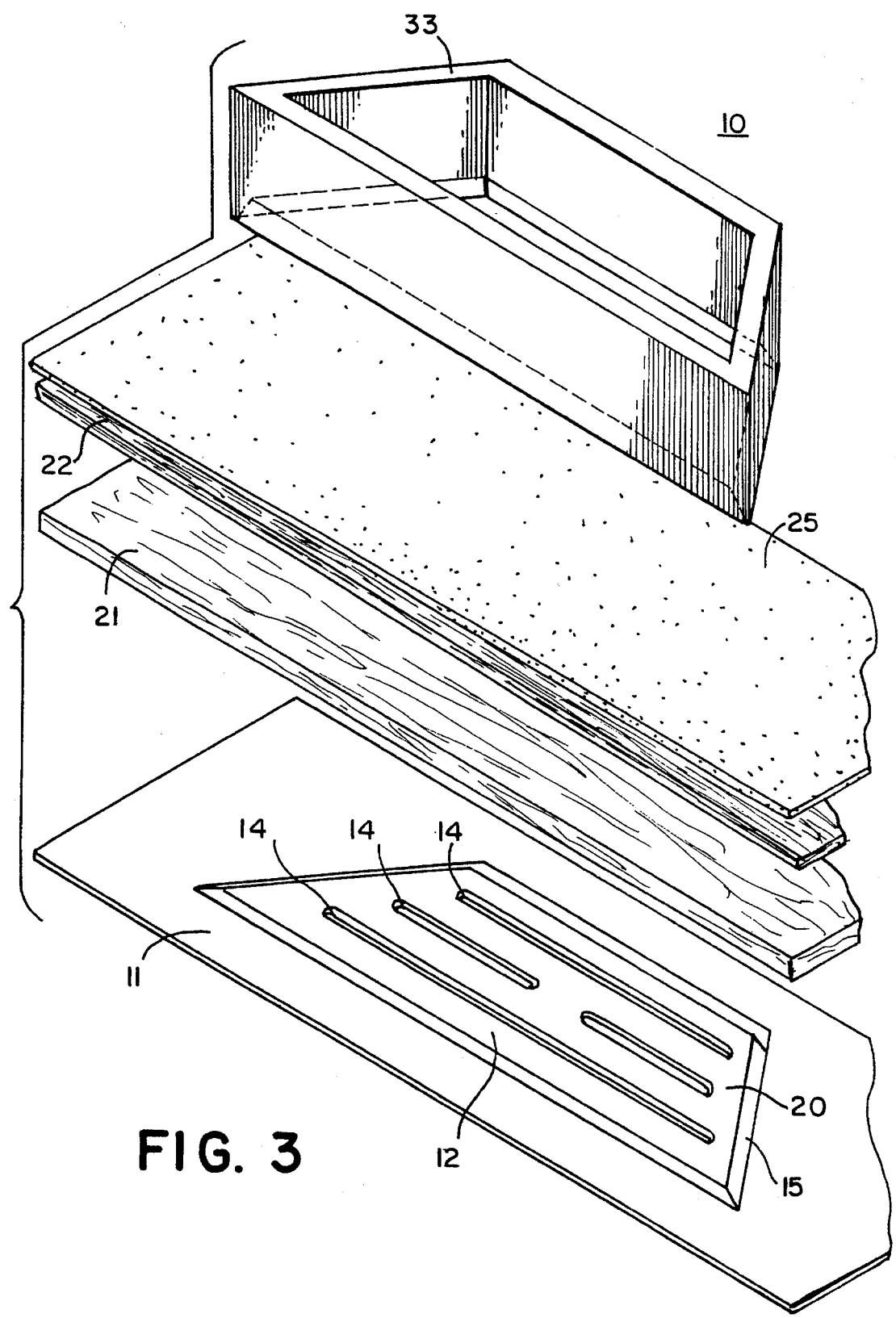
FIG. 3 is an exploded perspective view, enlarged, of the door panel construction of the invention.

Referring now more particularly to FIGS. 1–3 inclusive of the drawings, one embodiment of automotive door panel construction 10 is therein illustrated.

The door panel 10 includes a backing layer 11 which is preferably vacuum formed of ABS plastic to the desired shape. The backing 11 as illustrated, is of rectangular configuration with a raised inner plate 12. The plate 12 has a plurality of stiffening ribs 14 therealong and a perimeter trough 15 therearound. The trough 15 has a vertical wall 16, with an angled wall 17 extending therefrom at an angle of from 15 to 75 degrees which wall 17 joins the face 20 of plate 12. A layer 21 of padding material is provided which covers plate 12, trough 15 and extends over the backing layer 11 as required. The padding layer 21 can be of any desired foam-like material, with the preferred material being a polyester fabric, which is resin impregnated, and needled, and available from Fiberbond Corporation of Michigan City, Ind.

A layer 22 of dry adhesive netting is provided above layer 21, of any desired type, and preferably of Spunfab available from Spunfab Inc., of Akron, Ohio.

An outer or cover layer 25 is provided above layer 22, which can be of fabric, vinyl, leather, or other materials as desired.

The layers 11, 21, 22 and 25 are assembled as shown in FIG. 1, and placed in a dielectric sealing apparatus 30 which has a fixed Bed 31 connected to ground, with a trough 32 to receive trough 15 of panel 10. A punch 33 is provided which is vertically movable and constructed of material which reacts to radio frequency energy. The punch 33 has an outside configuration and a bottom wall 35 which conforms to the troughs 15 and 32.

In operation, the punch 33 is moved downwardly against layer 25 which is stretched, removing any wrinkles and which then pinches the layers 11, 21, 22 and 25 together in trough 32. The die 30 is a dielectric sealing die of well known type, which when it is in operating position as shown in FIGS. 1 and 3 has radio frequency energy applied thereto which causes the die 30 to become hot and the ABS plastic backing layer 11 to melt, the padding layer 21 to melt and join to the ABS layer 11. The adhesive layer 22 also melts and bonds to the outer layer 25 and the padding layer 21.

The radio frequency energy is terminated and the finished panel 10 removed from apparatus 30. The panel 10 can be trimmed around the trough 15 as required and incorporated into a complete door panel.

It will thus be seen that structure has been provided with which the objects of the invention are achieved.

I claim:

1. Multi-layered automotive door panel construction for incorporation into a complete door panel, which comprises a backing layer of vacuum formed plastic, a raised rectangular plate in said layer, a trough in said backing layer integral with said plate, surrounding and delineating the perimeter of said plate, a layer of padding material in contact with and overlying said plate and said trough, and bonded thereto in said trough, a layer of dry adhesive netting in adherent contact with said padding layer, and an outer covering layer in adherent contact with said dry adhesive layer.

2. Automotive door panel construction as defined in claim 1 in which said backing layer is of ABS plastic.

3. Automotive door panel construction as defined in claim 1 in which said trough has a vertical wall and an angled wall which joins said plate, and said angled wall is at an angle with said vertical wall in the range of 15 to 75 degrees.

4. Automotive door panel construction as defined in claim 1 in which said layers are dielectrically bonded.

5. Automotive door panel construction as defined in claim 1, in which a plurality or stiffening ribs extend along said plate.

6. Automotive door panel construction as defined in claim 1, in which said padding layer is of resin impregnated needled polyester fabric.

* * * * *